US012583690B2

(12) United States Patent
Barsamian

(10) Patent No.: US 12,583,690 B2
(45) Date of Patent: Mar. 24, 2026

(54) AUTOMATED BAGGAGE HANDLING CARTS AND SYSTEMS

(71) Applicant: Accenture Global Solutions Limited, Dublin (IE)

(72) Inventor: Paul Michael Barsamian, Glenview, IL (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 730 days.

(21) Appl. No.: 17/969,311

(22) Filed: Oct. 19, 2022

(65) Prior Publication Data

US 2023/0126064 A1 Apr. 27, 2023

Related U.S. Application Data

(60) Provisional application No. 63/270,753, filed on Oct. 22, 2021.

(51) Int. Cl.
B65G 47/52 (2006.01)

(52) U.S. Cl.
CPC ...... B65G 47/52 (2013.01); *B65G 2201/0264* (2013.01); *B65G 2203/044* (2013.01)

(58) Field of Classification Search
CPC ...... B65G 2203/044; B65G 2201/0264; B65G 47/52; B65G 67/02; B65G 65/00; B64F 1/324; B64F 1/368
See application file for complete search history.

(56) References Cited

U.S. PATENT DOCUMENTS

| 6,321,900 B1 | 11/2001 | Micklethwaite |
| 6,895,301 B2 | 5/2005 | Mountz |

(Continued)

FOREIGN PATENT DOCUMENTS

| CN | 112278770 | 1/2021 |
| FR | 2283073 | 3/1976 |

(Continued)

OTHER PUBLICATIONS

Extended Search Report in European Appln. No. 22203001.7, dated Jul. 21, 2023, 8 pages.

(Continued)

*Primary Examiner* — Timothy R Waggoner
(74) *Attorney, Agent, or Firm* — Mannava & Kang, P.C.

(57) ABSTRACT

Automated and/or autonomous material handling equipment include conveyors and/or baggage carts that can be used in material handling systems for safe and efficient package movement and management within facilities such as warehouses, airports, campuses and/or other locations. In some examples, material handling systems include a conveyor that can be tilted and/or raised in a motorized and automated manner. In some embodiments, the autonomous baggage carts include a cart body defining an interior space configured for receiving baggage items, driven wheels attached to the cart body, an onboard microcomputer and antenna configured for wireless communication with a remotely located computerized baggage handling management and control logistics system, and a door conveyor movably attached to the cart body. In some examples, an automated conveyor system described herein can be used separately from the baggage cart.

10 Claims, 15 Drawing Sheets

(56) References Cited

U.S. PATENT DOCUMENTS

| | | | |
|---|---|---|---|
| 8,220,710 B2 | 7/2012 | Hoffman et al. | |
| 9,457,917 B2 | 10/2016 | Dadyala | |
| 10,279,911 B2 | 5/2019 | Murphy et al. | |
| 11,378,968 B2 * | 7/2022 | Velten | B65G 65/00 |
| 11,560,079 B2 * | 1/2023 | Lundeen | B60P 1/38 |
| 11,577,858 B2 | 2/2023 | Cottle et al. | |
| 12,007,772 B2 * | 6/2024 | Senske | B60P 3/00 |
| 12,112,578 B2 | 10/2024 | Mateer | |
| 12,204,980 B2 | 1/2025 | Bonafe et al. | |
| 12,227,305 B2 | 2/2025 | Keene et al. | |
| 2007/0225993 A1 | 9/2007 | Moore | |
| 2012/0143427 A1 | 6/2012 | Hoffman et al. | |
| 2013/0048466 A1 | 2/2013 | Tsunoi | |
| 2016/0075449 A1 | 3/2016 | Ziegler | |
| 2017/0004384 A1 | 1/2017 | Audo et al. | |
| 2018/0018627 A1 | 1/2018 | Ross et al. | |
| 2018/0079601 A1 * | 3/2018 | Khong | B62B 3/005 |
| 2020/0233901 A1 | 7/2020 | Crowley et al. | |
| 2021/0072754 A1 | 3/2021 | Senske | |
| 2021/0284358 A1 | 9/2021 | Cottle et al. | |

FOREIGN PATENT DOCUMENTS

| | | |
|---|---|---|
| JP | S61193917 U | 12/1986 |
| WO | 2021/046545 A1 | 3/2021 |

OTHER PUBLICATIONS

Extended Search Report in European Application No. 22203004.1, dated Feb. 27, 2023, 10 pages.

Article 94 Examination Report in European Application No. 22203001.7, dated Nov. 21, 2025, 6 pages.

* cited by examiner

100

110

120

130

140

150

10

10

140

140

140

140

100

150

140

110

130

10

1

AUTOMATED BAGGAGE HANDLING CARTS AND SYSTEMS

CROSS-REFERENCE TO RELATED APPLICATIONS

This application claims the benefit of U.S. Provisional Application Ser. No. 63/270,753 filed Oct. 22, 2021. The disclosure of the prior application is considered part of (and is incorporated by reference in) the disclosure of this application.

TECHNICAL FIELD

This disclosure generally relates to automated and/or autonomous material handling equipment including conveyors, baggage carts and baggage handling systems for baggage and package transportation and management within airports, campuses, and/or other locations.

BACKGROUND

A baggage handling system (BHS) is a system that includes multiple baggage handling carts and conveyor systems installed in airports. For example, the BHS is used to transport checked luggage from ticket counters to areas where the bags can be loaded onto airplanes. A BHS also transports checked baggage coming from airplanes to baggage claims, or to an area where the baggage can be loaded onto another airplane. A BHS is made up of a number of different processes and checks. In some cases, a BHS is designed to count bags, check weights of bags, balance loads, screen suitcases for security reasons, transport bags through an airport conveyor belt system and read bag information automatically.

Conventional BHSs have many aspects that require manual labor. Additionally, conventional BHSs are prone to routing errors, delays, and tend to be resource intensive.

SUMMARY

This disclosure describes automated and/or autonomous material handling equipment including conveyors, baggage carts, and BHSs for baggage and package management within airports, campuses, order fulfillment centers, warehouses, and/or other locations. In some embodiments, the conveyors and/or baggage carts described herein include novel mechanization for manipulating the incline and positioning of the conveyor in order to close the gap between conveyors moving baggage/packages and another system, such as a baggage cart. These features can eliminate the need for a human worker or fixed-location-style of robotic arm to pick up and move the baggage/packages. The baggage carts can also include an internal robotic sort/movement mechanism. In some embodiments, the baggage carts can include a combination of autonomous driving technologies (e.g., SLAM, GPS, computer vision), and can be provided with meccano-style wheels (e.g., Mecanum wheels) to move, navigate and transit airports and campuses through tight spaces and corridors.

The automated and/or autonomous material handling equipment (e.g., conveyors, baggage carts, and BHSs) described herein may be used to provide one or more of the following optional benefits and advantages. First, the conveyors, baggage carts and BHSs described herein are more automated in comparison to conventional systems. Accordingly, the conveyors, baggage carts and BHSs described herein enhance worker safety by reducing the need for manual handling of baggage. The enhanced safety can provide benefits such as increased worker satisfaction, enhanced baggage handling system runtime availability or overall equipment effectiveness, and reduced operational costs.

Second, in some embodiments the automation provided by the baggage carts and BHSs described herein can provide lower overall operational costs due to reducing the needs for human labor.

Third, in some embodiments the traceability of baggage items is enhanced using the baggage carts and BHSs described herein, and routing errors are reduced. These enhancements can lead to increased customer satisfaction.

Fourth, the inventive concepts described herein can be implemented in other form factors in addition to baggage carts. For example, in some embodiments the conveyor portion of the baggage cart can be used separately from the cart portion of the baggage cart. That is, the conveyor portion alone can be used to transfer baggage and/or packages between any two areas, such as between two conveyor systems, and the like.

In one aspect, this disclosure is directed to a material handling system that includes a conveyor, a first motor, and a clutch. The conveyor includes: (i) a frame and (ii) a first conveyor roller having a first axle. The first motor is arranged to drive rotations of the first axle. The clutch is arranged to releasably couple the first axle to the frame.

Such a material handling system may optionally include or more of the following features. The system may also include a linear actuator coupled to the first axle and configured to move the first axle from a home position to a plurality of other positions. The system may also include a clutch activation mechanism that causes the clutch to couple the first axle to the frame in response to the first axle being in the home position. The clutch activation mechanism may include a clutch guide that applies force to move the clutch into an activated position as the first axle moves into the home position. The force from the clutch activation mechanism may cause the clutch to slide along the first axle and into engagement with a spline on the first axle. The system may also include a spring that biases the clutch away from the activated position. The system may also include an axle pulley attached to the first axle. The system may also include a drive belt arranged to apply torque from the first motor to the pulley. The system may also include an idler pulley, wherein the drive belt extends between the axle pulley and the idler pulley. The linear actuator may include a leadscrew; a nut engaged with threads of the leadscrew and rotatably coupled to the first axle; and a second motor arranged to drive rotations of the leadscrew. In some embodiments, the home position is an end of travel position of the linear actuator. The first conveyor roller may be positioned at a first end of the frame. The system may also include a second conveyor roller attached at a second end of the frame that is opposite of the first end of the frame. The second conveyor roller may be an idler roller. The conveyor may also include a belt that extends between the first and second conveyor rollers.

In another aspect, this disclosure is directed to baggage carts. In some embodiments, the baggage cart includes a cart body defining an interior space configured for receiving baggage items, wheels attached to the cart body, a microcomputer and antenna, and a door conveyor movably attached to the cart body. One or more of the wheels are configured to be driven by an on-board electric motor that is powered by an on-board battery. The microcomputer and antenna are configured for wireless communication, control, and/or messaging with a remotely located computerized baggage handling management and control logistics system. The door conveyor comprises a powered conveyor.

Such a baggage cart may optionally include one or more of the following features. The door conveyor may be automatically pivotable and automatically translatable relative to the cart body. The baggage cart may also include a powered ball conveyor located on a floor of the cart body. The baggage cart may also include a robotic pusher arm mounted to the cart body. The robotic pusher arm may be configured to automatically push the baggage items in response to actuation signals received from the microcomputer. The robotic pusher arm may be mounted to a ceiling of the cart body. The baggage cart may also include a barcode or RFID chip scanner system in communication with the microcomputer. The baggage cart may also include a vision system in communication with the microcomputer. The baggage cart may also include one or more sensors configured to detect an upper-most level of baggage items in the interior space. In some embodiments, the wheels are Mecanum omnidirectional drive wheels.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference symbols in the various drawings indicate like elements.

DETAILED DESCRIPTION

Figure 1:
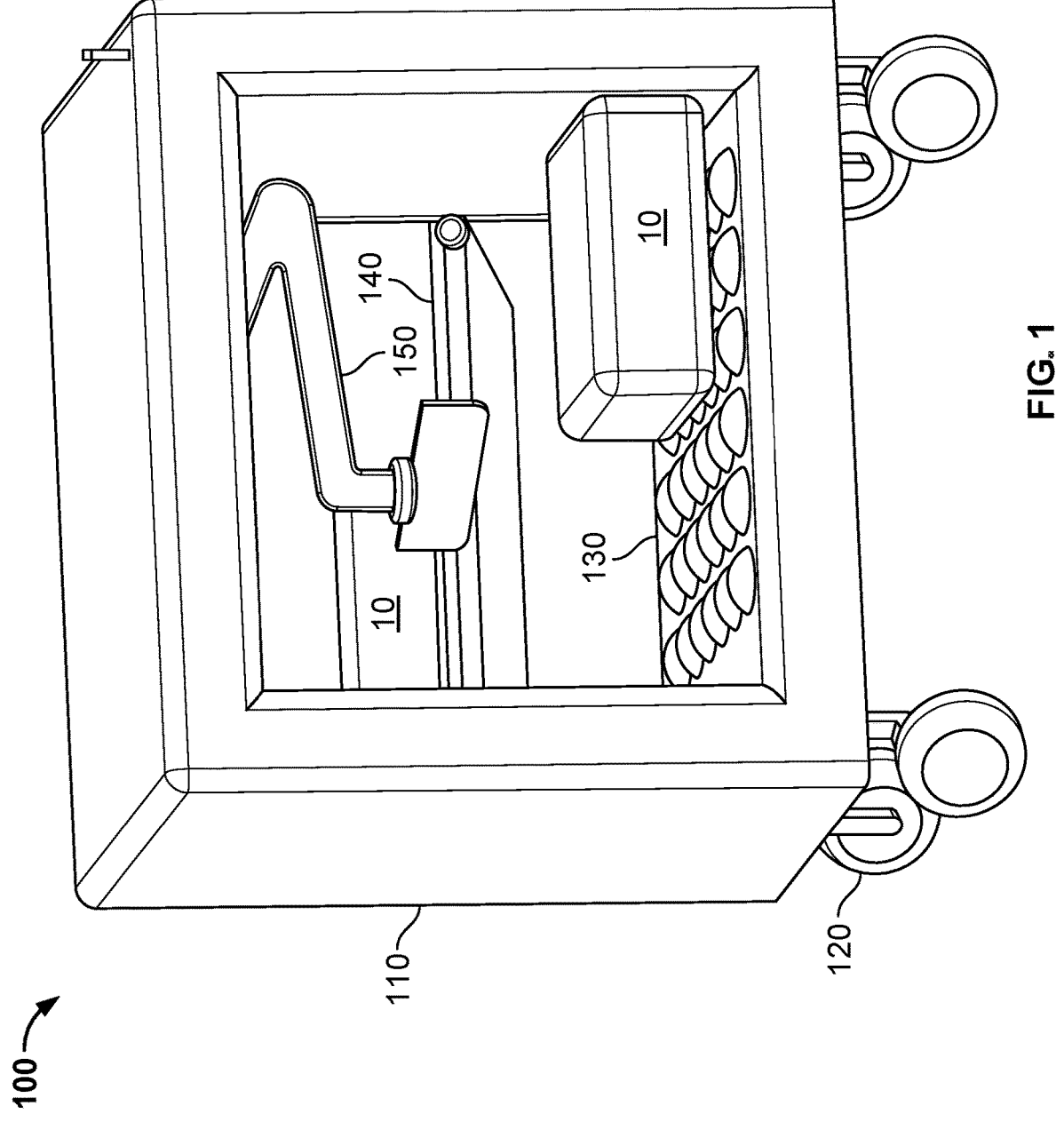
FIG. 1 is a perspective view of an example baggage cart in accordance with some embodiments.
Figure 2:
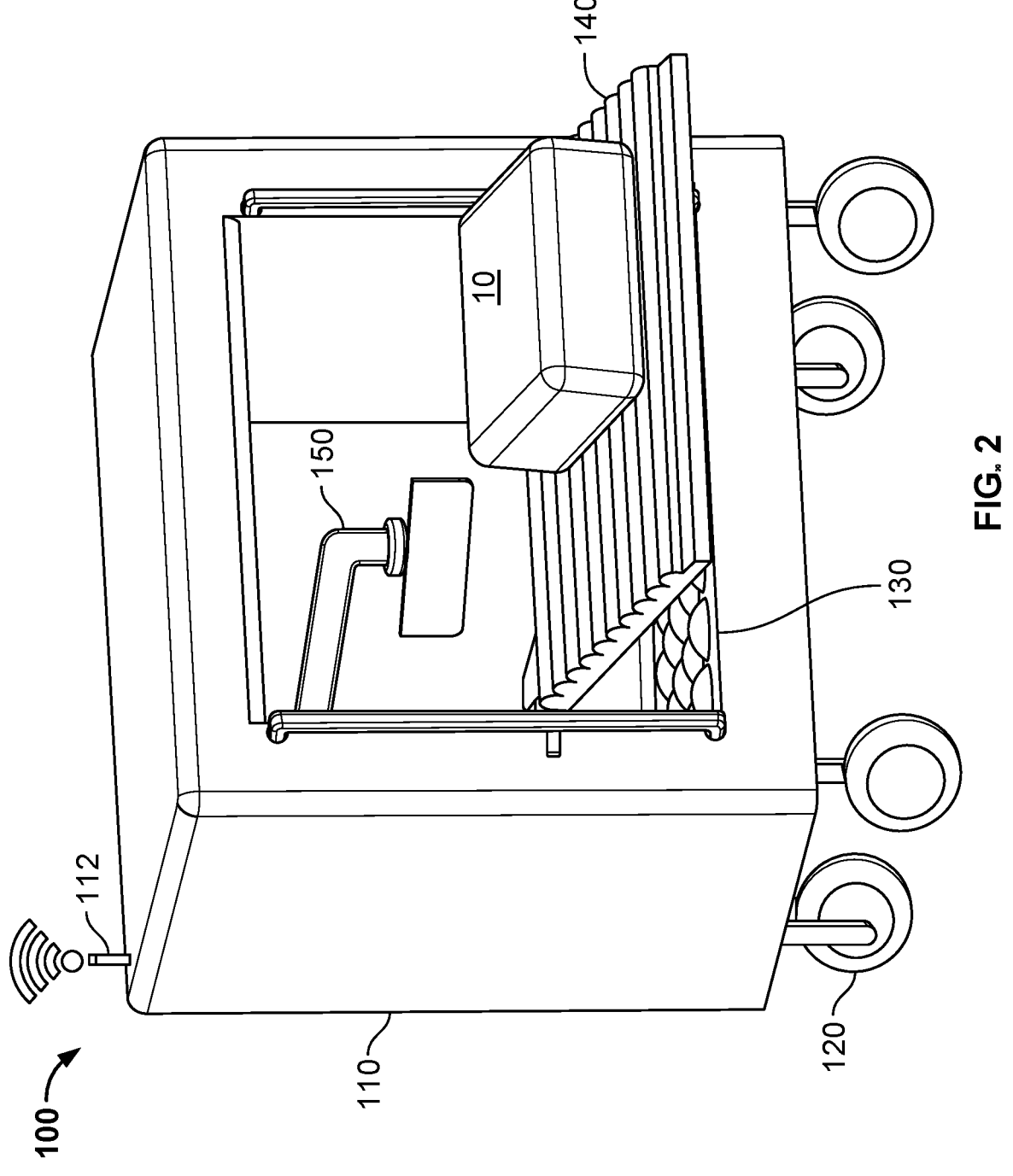
FIG. 2 is another perspective view of the baggage cart of FIG. 1.
Figure 3:
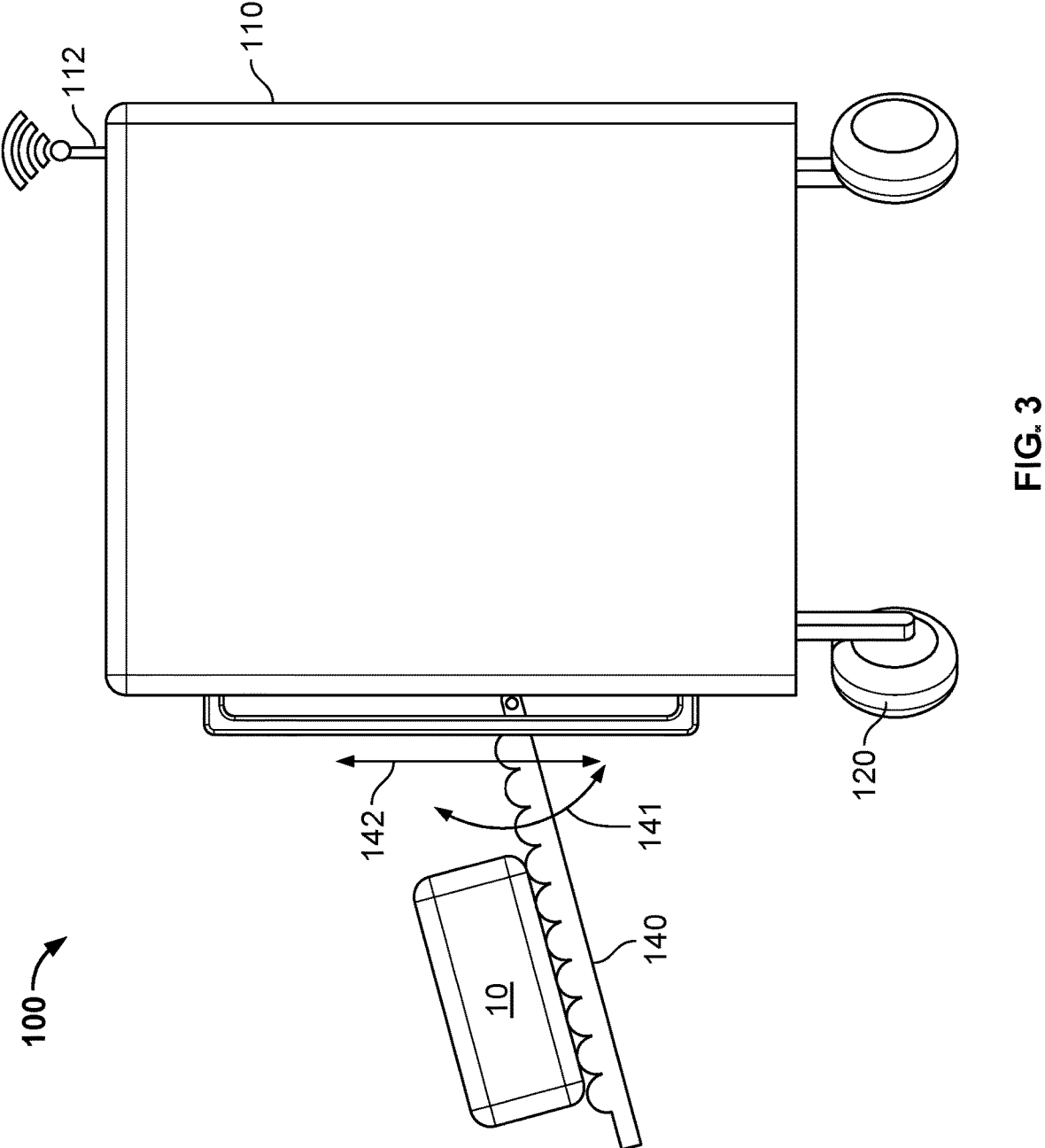
FIG. 3 is a side view of the baggage cart of FIG. 1.
Figure 4B:
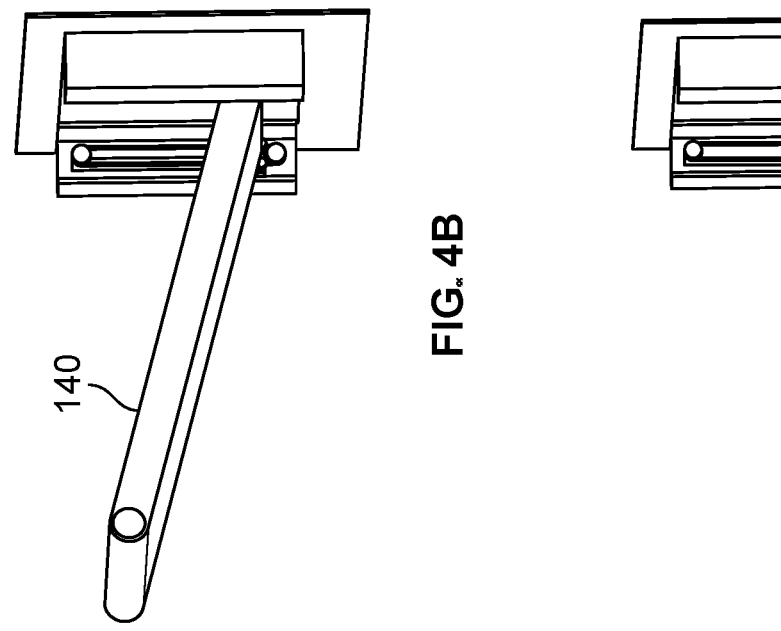
FIGS. 4A-4D are perspective views showing various orientations of a door conveyor of the baggage cart of FIG. 1.
Figure 4D:
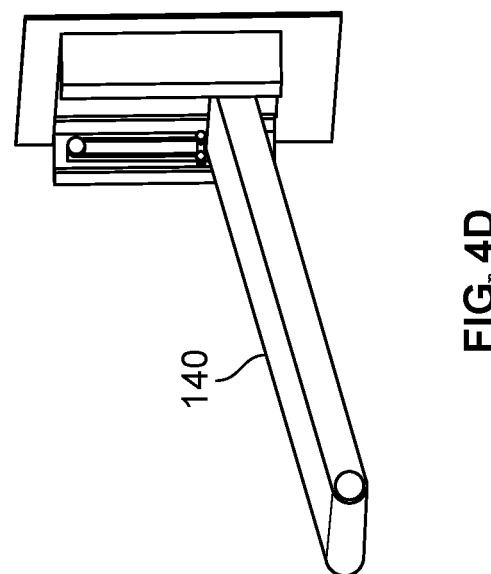
Figure 4A:
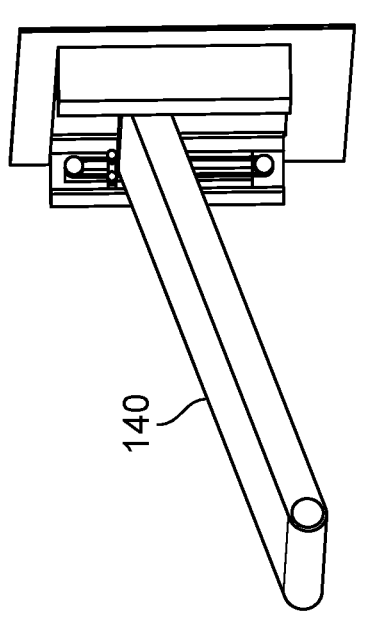
Figure 4C:
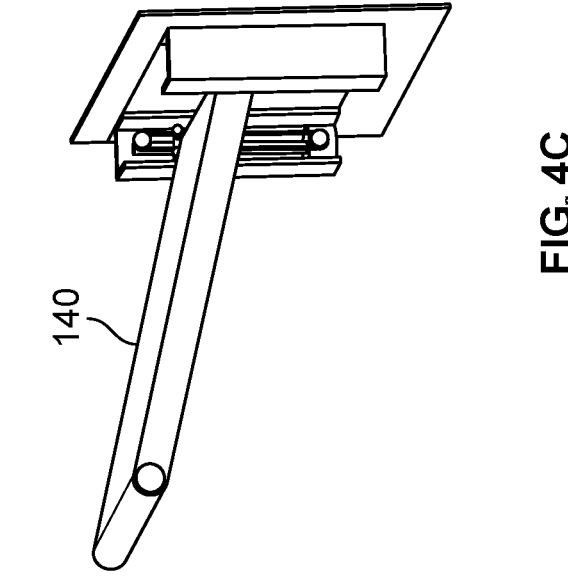
Figure 5:
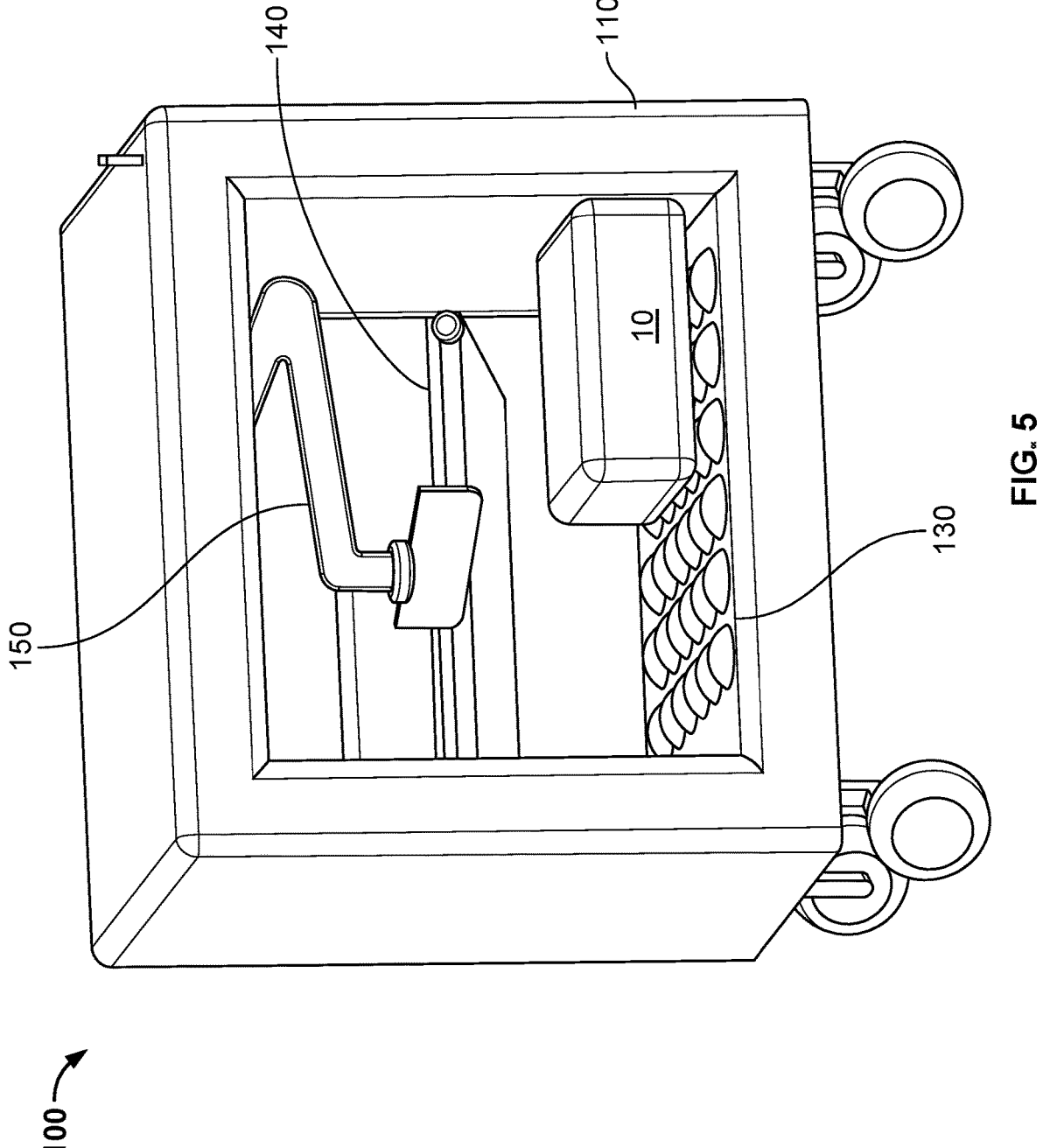
FIG. 5 is another perspective view of the baggage cart of FIG. 1.

As described further below, this disclosure describes automated and/or autonomous material handling equipment including conveyors, baggage carts, and BHSs for baggage and package movement and management within facilities such as airports, campuses, order fulfillment centers, warehouses, and/or other locations.

FIGS. 1-8 illustrate an example autonomous baggage cart 100 that can be used as part of the BHSs described herein. The baggage cart 100 can contain, identify, autonomously transport, and automatically transfer one or more baggage items 10.

While the concepts for baggage and package movement and management are being described herein primarily in the context of a baggage cart 100, it should be understood that the concepts can be implemented in other form factors in addition to the baggage cart 100. For example, in some embodiments the conveyor portion of the baggage cart 100 can be used separately from the cart portion of the baggage cart 100. That is, as described further below, the conveyor portion alone can be used to transfer parcels, containers, boxes, items, baggage, and/or packages between any two areas, such as between two conveyor systems, and the like.

The baggage cart 100 includes a cart body 110, wheels 120, a conveyor ball floor 130, a door conveyor 140, and a robotic pusher arm 150. In some embodiments, the baggage cart 100 can include one or more additional features that are not visible. For example, in some embodiments the baggage cart 100 includes an on-board battery and a drive system by which the baggage cart 100 is autonomously mobile using the wheels 120. The baggage cart 100 can also include an on-board microcomputer and wireless communication system. In some embodiments, the baggage cart 100 also includes an on-board vision system. The baggage cart 100 can also include one or more on-board sensors, scanners, and the like.

In some embodiments, the baggage cart 100 is configured to autonomously transport baggage items 10 under the control or directions from a computerized baggage handling management and control system as described further below. For example, in some embodiments the baggage cart 100 includes an antenna 112 and an on-board microcomputer running lightweight firmware/OS for wireless communication, tasking, and/or messaging and integration with a remotely located computerized baggage handling management and control logistics system. Accordingly, in some embodiments the baggage cart 100 is equipped to self-report bags on board with an effectively continuous broadcast. In some embodiments, the on-board microcomputer of the baggage cart 100 can fully or partly manage AGV routing, location, and navigation in addition to responding to tasking from external computerized baggage handling management and control logistics systems.

In some embodiments, the cart body 110 can include curb sensors, roadway sensors, navigation wire sensors, and/or other sensor arrays along the outer floor edge of the vehicle for navigation, parking, and collision avoidance assistance.

In some embodiments, the wheels 120 of the baggage cart 100 are configured to be driven by one or more on-board electric motors to convey the baggage cart 100. For example, in some embodiments the wheels 102 can be Mecanum omnidirectional drive wheels that allow the cart body 110 to rotate, move and turn with zero radius, and to navigate and park in forward, reverse, and sideways. Other types of conveyance systems that are suitable for automated guided vehicles and/or mobile robots can also be used.

The conveyor ball floor 130 of the baggage cart 100 can function to move baggage items 10, and/or allow manual movement of the baggage items 10, in any planar direction along the conveyor ball floor 130. This can functionality can be utilized during loading and unloading of one or more baggage items 10 to/from the baggage cart 100. In addition to loading and unloading, the functionality of the conveyor ball floor 130 can be utilized in conjunction with the on-board vision system to increase the packing density of the baggage items 10 in the baggage cart 100.

The baggage cart 100 also includes the door conveyor 140. While in the depicted embodiment a single door conveyor 140 is included, in some embodiments two door conveyors 140 are included in a single baggage cart 100. The door conveyor 140 is movable coupled to the cart body 110. For example, in the depicted embodiment the door conveyor 140 is pivotable in relation to the cart body 110 as indicated by the curved arrow 141. In addition, in the depicted embodiment the door conveyor 140 is translatable along the face of the cart body 110 as indicated by the arrow 142. These motions of the door conveyor 140 relative to the cart body 110 can be automatic (e.g., controlled by the on-board microcomputer and/or vision system.

FIGS. 4A-4D depicted various orientations of the door conveyor 140 relative to the cart body 110. Here, the door conveyor 140 is shown separately from the baggage cart 100. Accordingly, it should be understood that the concepts of the door conveyor 140 can be implemented in other form factors in addition to the baggage cart 100, as described further below. For example, in some embodiments the door conveyor 140 can be used separately from the cart portion of the baggage cart 100. That is, the door conveyor 140 portion alone can be used to transfer parcels, boxes, containers, items, baggage and/or packages between any two areas, such as between two conveyor systems, and the like. In such a case, the door conveyor 140 can be mounted on frame with wheels/casters in some embodiments.

The conveyance of the baggage items 10 on the door conveyor 140 can be powered and automatic. That is, the door conveyor 140 can be a powered conveyor. Accordingly, the baggage items 10 can be automatically loaded into or unloaded from the baggage cart 100. In some embodiments, the door conveyor 140 can automatically telescope to increase or decrease its length. In some embodiments, the door conveyor 140 can passively telescope to increase or decrease its length.

In some embodiments, the baggage cart 100 also includes the robotic pusher arm 150. However, the robotic pusher arm 150 is optional. In some embodiments, the robotic pusher arm 150 can automatically push baggage items 10 onto the door conveyor 140 during unloading. In some embodiments, the robotic pusher arm 150 can automatically push baggage items 10 around within the interior space of the cart body 110 to arrange the baggage items 10 (e.g., to increase packing density). The robotic pusher arm 150 can be a single robotic arm or paired robot arms suspended from ceiling of the cart body 110. An on-board vision system can use a high speed algorithm, along with the layer sensor of the door conveyor 140, to determine where to push a baggage item 10 in the layer of baggage items 10 within the cart body 110.

Figure 6:
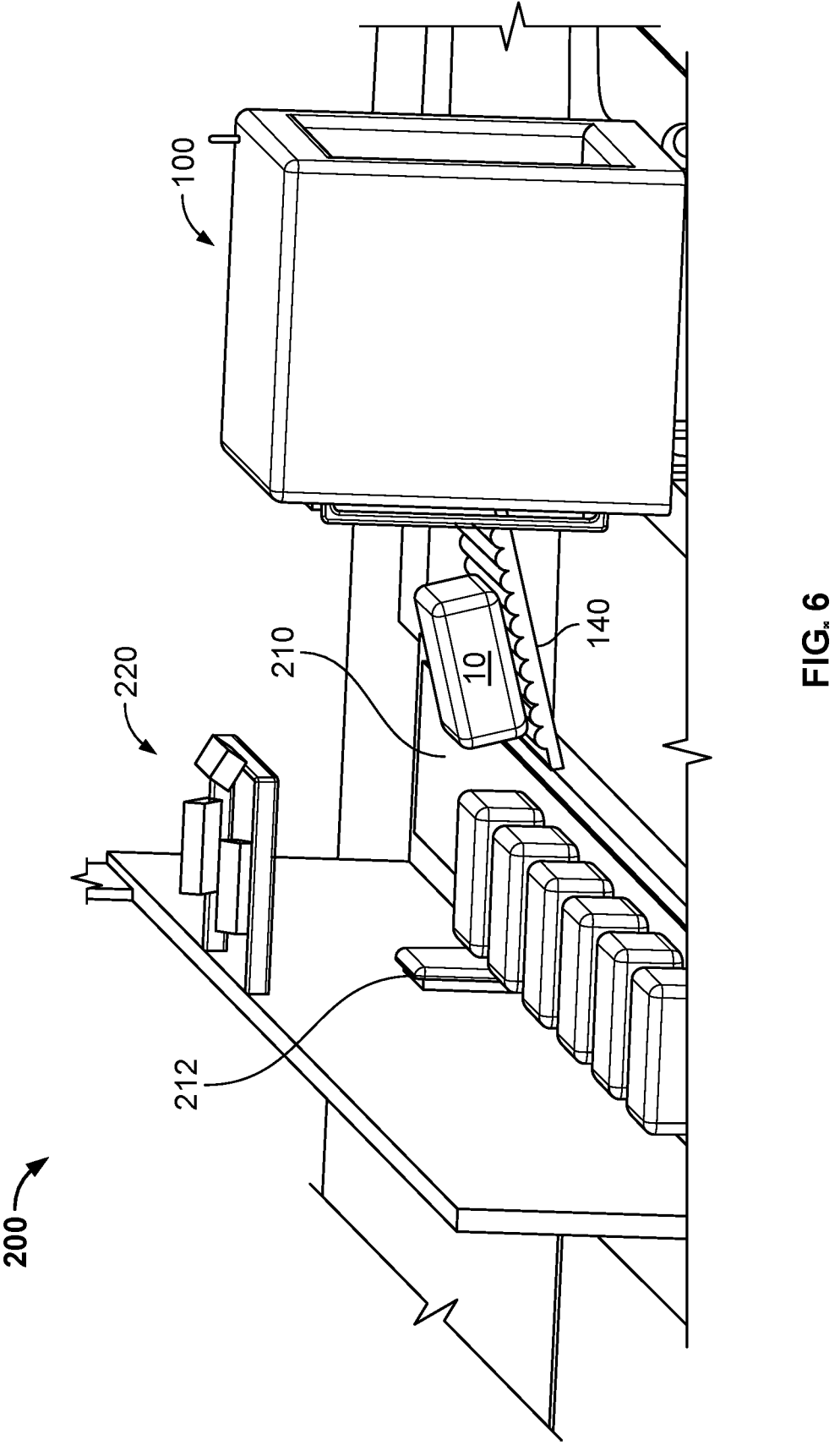
FIGS. 6 and 7 are perspective views of the baggage cart of FIG. 1 in the process of loading or unloading bags to/from a conveyor system.

FIG. 6 illustrates the functionality of the baggage cart 100 in conjunction with a baggage conveyor system 200. The baggage cart 100 can interface with a conveyor 210 to load and/or unload baggage items 10. In particular, the door conveyor 140 can be automatically orientated (e.g., the vertical position and angular orientation) in relation to the conveyor 210 so that baggage items 10 can be transferred between the conveyor 210 and the door conveyor 140. In some embodiments, the baggage conveyor system 200 can also include a baggage pusher 212 to automatically push individual baggage items 10 onto the door conveyor 140.

In some embodiments, the baggage conveyor system 200 includes a scanner system 220 that can scan bar codes (or read RFID chips) on tags attached to the baggage items 10. Accordingly, the baggage items 10 are traceable. For example, using the scanner system 220, the identities of individual baggage items 10 can be determined while loading and/or unloading the baggage items 10 to/from the baggage cart 100. In some embodiments, the baggage cart 100 can also include a scanner system that can read bar codes or RFID chips. The scanner system 430 can be in communication with the control system to facilitate traceability of the baggage items 10.

The scanner system 220 can also be used to sort the baggage items 10. That is, using the scanner system 220 some particular baggage items 10 can be loaded into a particular baggage cart 100 (e.g., those baggage items 10 that need to go to a particular airplane or other destination), while other baggage items 10 can be passed over rather than being loaded into the particular baggage cart 100.

Figure 7:
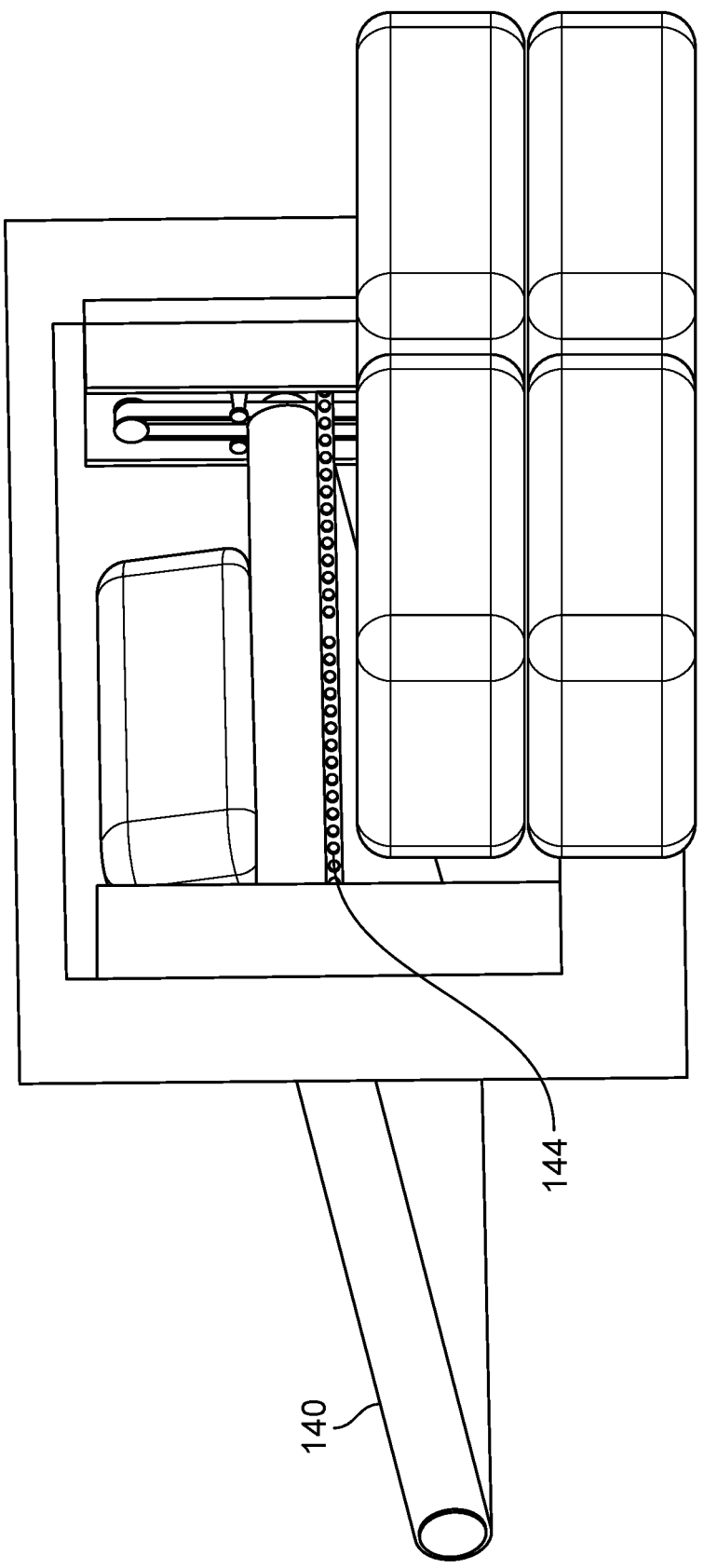

FIG. 7 illustrates that some embodiments, the door conveyor 140 includes one or more layer sensors 144 (e.g., optical sensors, ultrasonic sensors, etc.) to sense the position of the upper-most layer of the baggage items 10, and to indicate that the up/down movement of the door conveyor 140 for loading or unloading the next layer of the baggage items 10 should take place. For example, when baggage items 10 are being transferred into the baggage cart 100, in some embodiments the door conveyor 140 will automatically move upward when the layer sensors 144 determine that there is no more room for baggage items 10 in the current layer. Conversely, when baggage items 10 are being transferred out of the baggage cart 100, in some embodiments the door conveyor 140 will automatically move downward when the layer sensors 144 determine that there are no baggage items 10 in the current layer.

In some embodiments, the door conveyor 140 can automatically telescope to increase or decrease its length. In some embodiments, the door conveyor 140 can passively telescope to increase or decrease its length.

Figure 8:
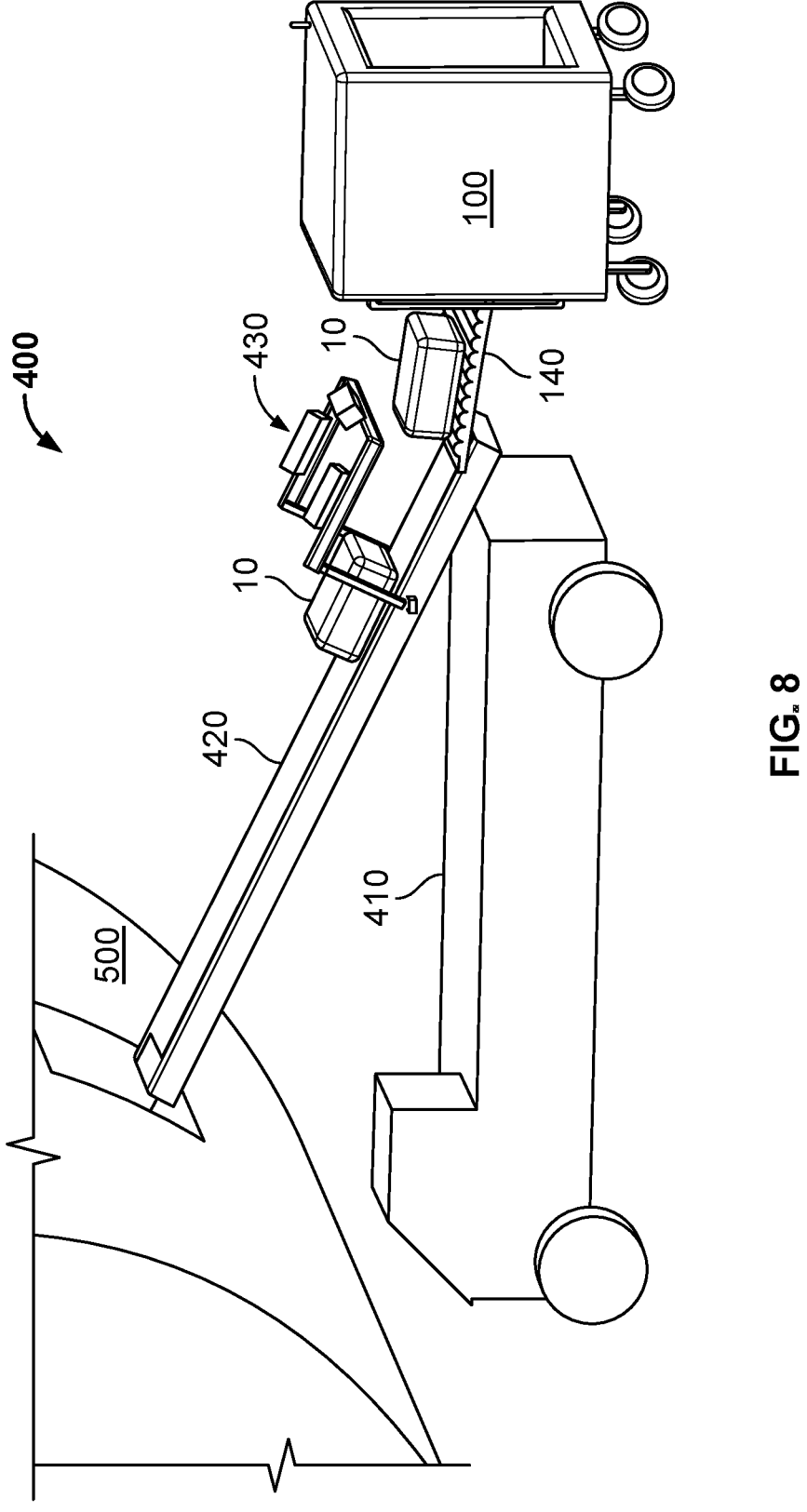
FIG. 8 is a perspective view of the baggage cart of FIG. 1 in the process of loading or unloading bags to/from a conveyor ramp truck.
Figure 9:
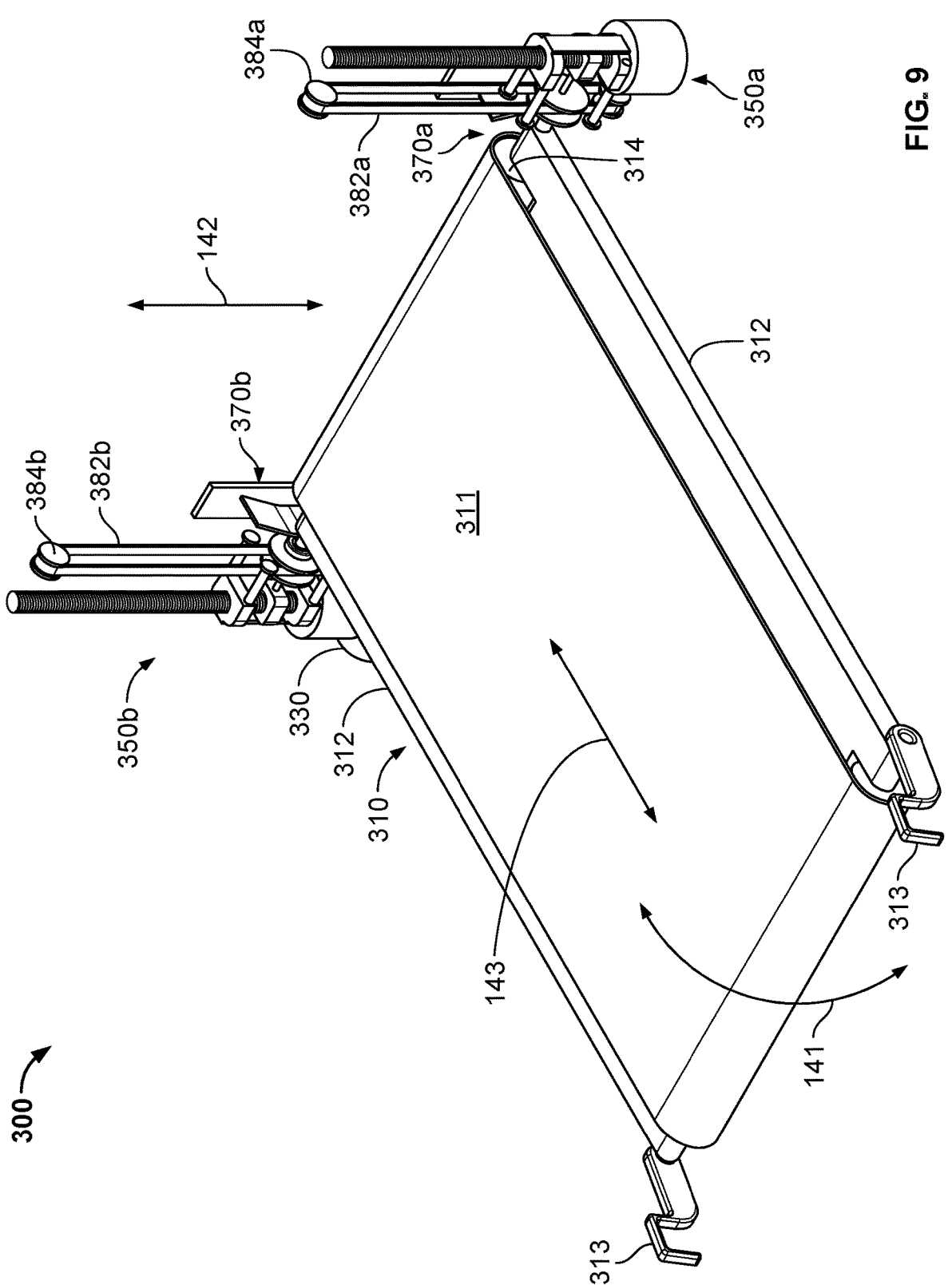
FIG. 9 is a perspective view of an example material handling system in accordance with some embodiments.
Figure 10:
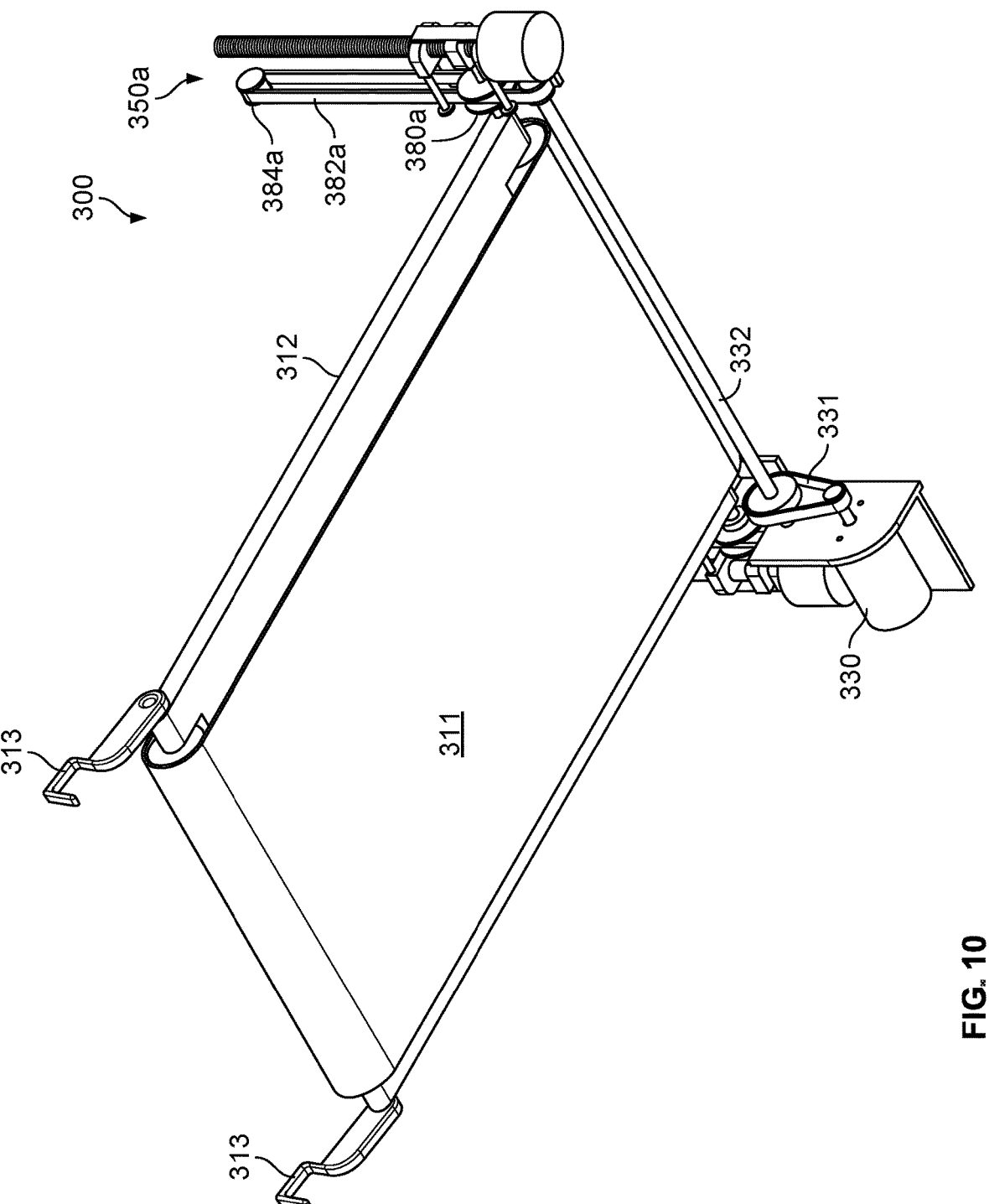
FIG. 10 is another perspective view of the material handling system of FIG. 9.

Referring to FIG. 8, the baggage carts 100 can autonomously travel onto a tarmac for loading or unloading of baggage items 10 to/from an airplane 500 using a conveyor ramp truck 400. The door conveyor 140 can automatically open and orient itself to interface with a conveyor 420 that is pivotably mounted to a truck 410. Baggage items 10 can be transferred between the baggage cart 100 and the conveyor 420 using one or more of the door conveyor 140, the robotic pusher arm 150 (not visible), on-board vision system, on-board sensors, scanner system, etc.

The conveyor ramp truck 400 can include a scanner system 430 for scanning bar codes or RFID chips of the baggage items 10 being transferred between the baggage cart 100 and the conveyor 420. The scanner system 430 can be in communication with the control system to facilitate traceability of the baggage items 10.

FIGS. 9-16 illustrate an example material handling system 300. In some embodiments, the material handling system 300 can be used to function as the door conveyor 140 described above. In the depicted embodiment, the material handling system 300 includes a conveyor belt 311 that can be driven to transport various types of items (e.g., parcels, boxes, suitcases, items, envelops, packages, goods, totes, containers, etc.). In some embodiments, the material handling system 300 can be a roller conveyor or another type of conveyor.

While the door conveyor 140 is primarily described above in the context of the baggage cart 100, the material handling system 300 has beneficial utility in many other implementations. For example, in some embodiments the material handling system 300 can be used for transferring items from, to, and/or between various types of conveyors, racks, trucks, shipping containers, carts, pallets, and the like, and any combination thereof. Moreover, in some embodiments the material handling system 300 can be used for receiving and/or loading items manually and/or robotically. For example, in some embodiments the material handling system 300 can be used to load a shipping container with multiple items that are placed onto the material handling system 300 manually and/or robotically.

In some embodiments, the material handling system 300 is mounted to a mobile frame that includes wheels, or that can be transported using a pallet jack or fork truck, and the like. In such a case, the material handling system 300 can be transported to various locations for temporary use in a particular location of multiple locations, as desired. In other cases, the material handling system 300 can be mounted in a fixed location (e.g., next to a conveyor—mounted to the floor or to the conveyor and the like).

The structure and operation of the material handling system 300 will now be described. The material handling system 300 broadly includes a conveyor 310, a first motor 330, and one or more clutches 340 (shown in the figures as two clutches 340a and 340b; collectively referred to as "clutch 340a/b"). While the depicted embodiment includes two clutches 340a/b, in some embodiments a single clutch 340a or 340b is included.

As described further below, the material handling system 300 mechanically has at least three degrees of freedom. First, the elevation of the conveyor 310 (or at least the driven end of the conveyor 310) can be changed (raised and/or lowered). This is illustrated by a double arrow 142 in FIGS. 3 and 9. Second, the angle of the conveyor 310 can be adjusted. Said another way, the conveyor 310 can be tilted or pivoted. This is illustrated by an arcuate double arrow 141 in FIGS. 3 and 9. Third, the conveyor 310 can be driven so that items placed onto the conveyor 310 are transported by the conveyor 310. This is illustrated by a double arrow 143 in FIG. 9.

Figure 11:
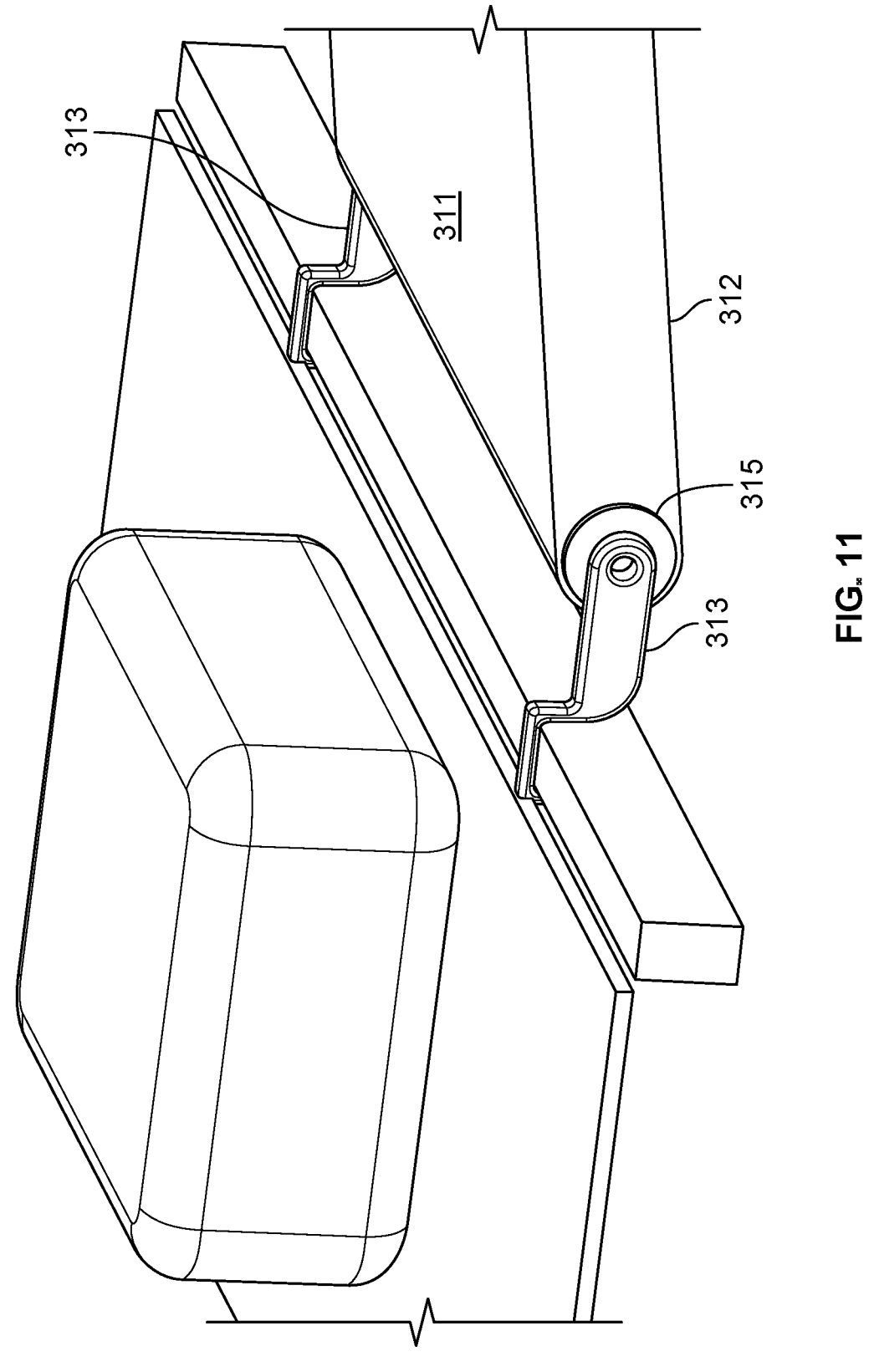
FIG. 11 is a perspective view of a second end of the material handling system of FIG. 9 in engagement with an example conveyor system.

The conveyor 310 includes a frame 312 and a first conveyor roller 314 having a first axle 316. The first conveyor roller 314 is a driven roller. The conveyor 310 can also include a second conveyor roller 315 (FIG. 11) which can be an idler roller. The belt 311 (which is like a loop) can extend between/around the first conveyor roller 314 and the second conveyor roller 315. Also shown predominantly in FIG. 11 are two conveyor attachment arms 313. The conveyor attachment arms 313 can be used for releasably coupling the conveyor 310 to another piece of equipment (such as a conveyor, cart, item receptacle, etc.).

In the depicted embodiment, the first conveyor roller 314 and the first axle 316 are affixed (rigidly coupled) to each other. Accordingly, rotations of the first axle 316 result in rotations of the first conveyor roller 314 (which drives the conveyor belt 311 to transport items that are on the belt 311).

In the depicted embodiment, in order to change the elevation of the conveyor 310, the material handling system 300 includes a first linear actuator 350a and a second linear actuator 350b (collectively referred to as "linear actuator 350a/b"). The linear actuator 350a/b can be activated to raise or lower the first axle 316, which raises or lowers at least the driven end of the conveyor 310 (as indicated by the arrow 142 in FIG. 9). In some embodiments, the linear actuator 350a/b can be controlled by, or in response to, signals from the one or more layer sensors 144 (e.g., see FIG. 7).

Figure 12:
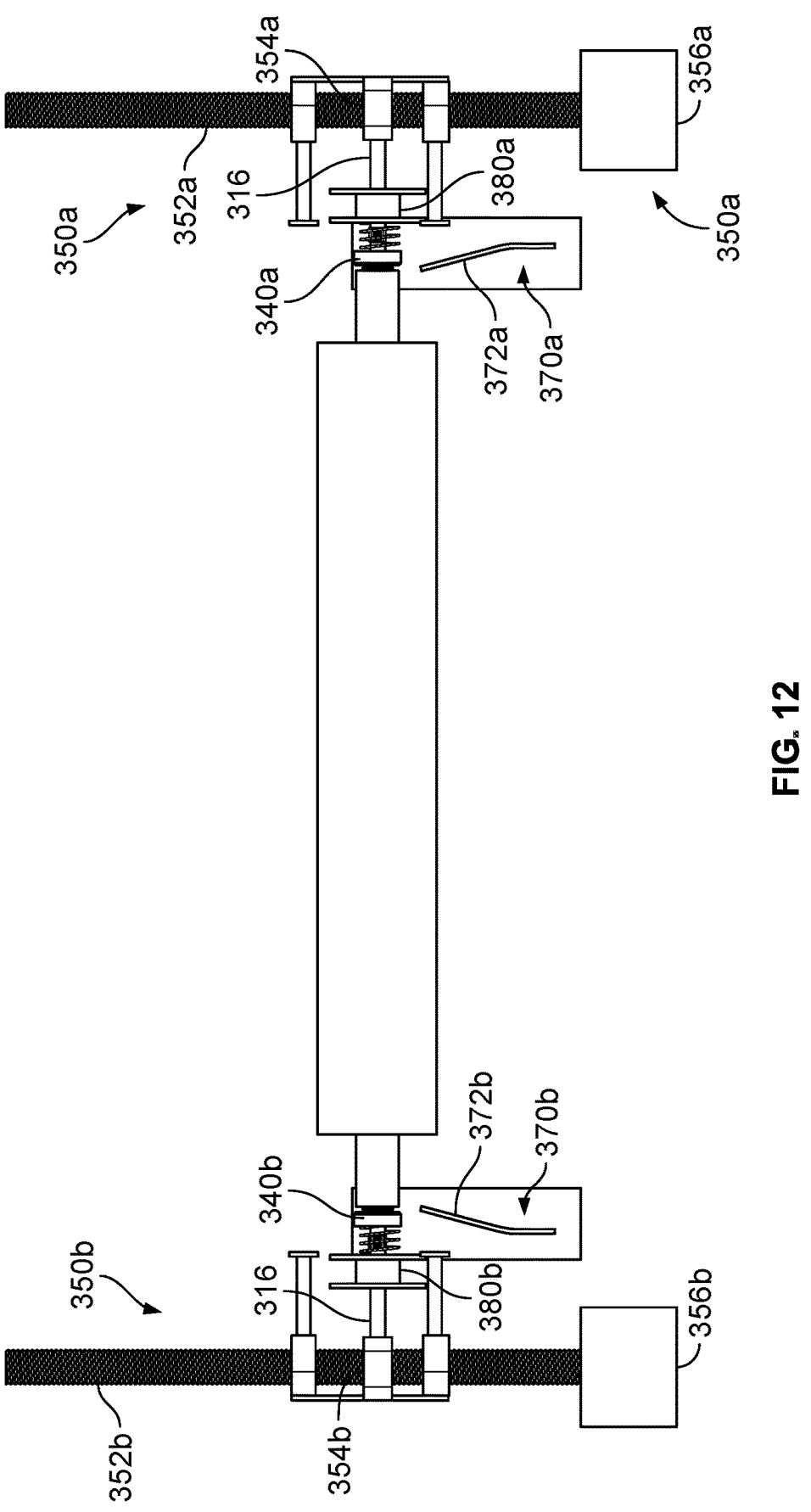
FIG. 12 illustrates a portion of the material handling system of FIG. 9.
Figures 13, 14:
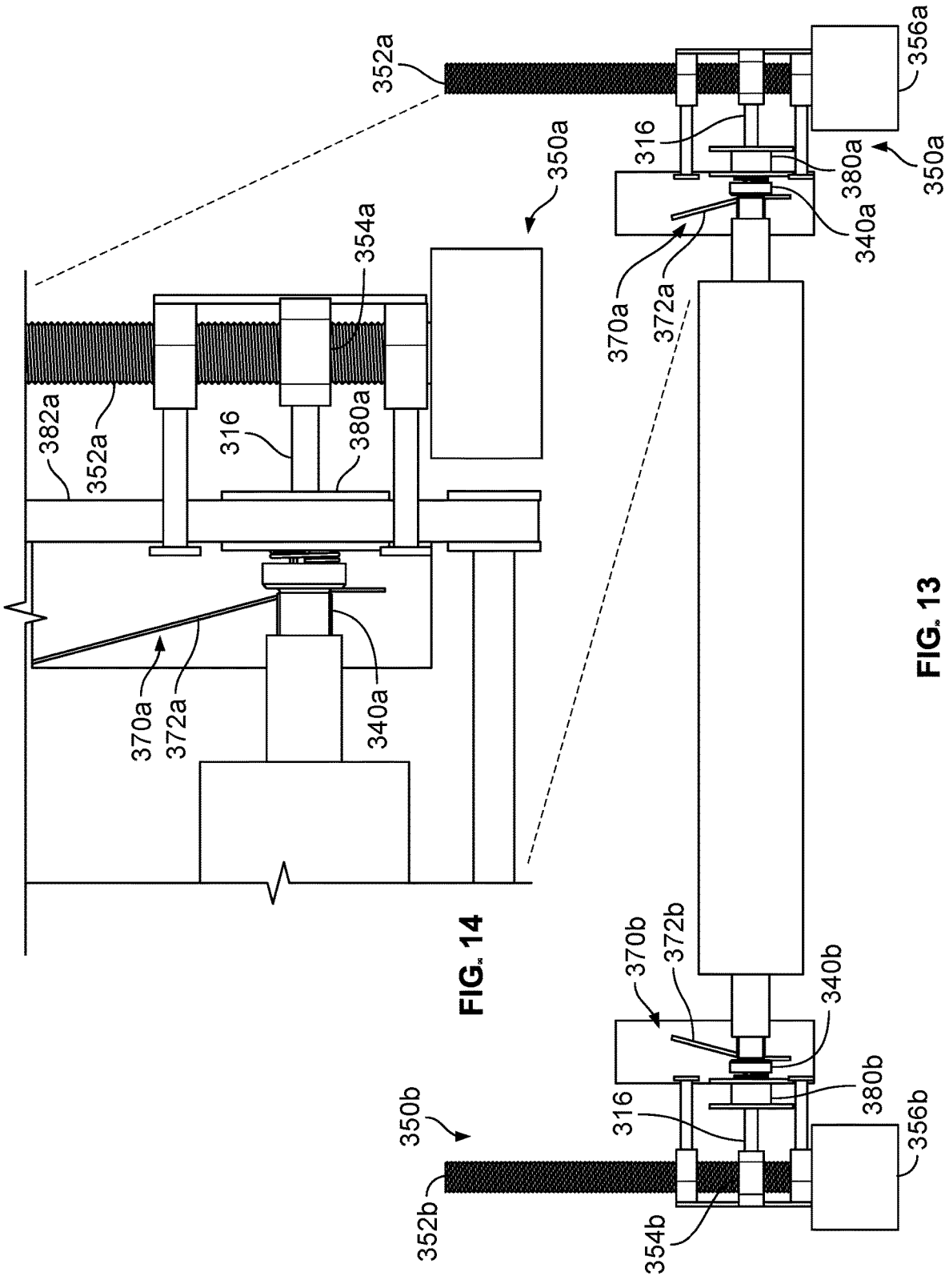
FIG. 13 illustrates the portion of the material handling system of FIG. 13 in a home position.
FIG. 14 is an enlarged view of an end of the portion of the material handling system of FIG. 13.

As best seen in FIGS. 12-14, in the depicted embodiment the linear actuator 350a/b includes a leadscrew 352a/b, a nut 354a/b, and a second motor 356a/b. The second motor 356a/b can be activated to drive rotations of the leadscrew 352a/b. In some embodiments, the second motor 356a/b can be a stepper motor or any other suitable type of rotary actuator. The nut 354a/b is in threaded engagement with the threads of the leadscrew 352a/b. The nut 354a/b is also rotatably coupled to the first axle 316. Accordingly, when the second motor 356a/b is activated to drive rotations of the leadscrew 352a/b, the nut 354a/b moves along the leadscrew 352a/b and causes the first axle 316 to raise or lower (as indicated by the arrow 142). In some embodiments, other types of linear actuators can be used rather than the leadscrews and nuts of the depicted linear actuator 350a/b.

Next, the mechanism that is used to change (e.g., to pivot) the tilt of the conveyor 310 will be described. As best seen in FIGS. 12-16, in the depicted embodiment, the first axle 316 is coupled to the frame 312 via the one or more clutches 340a/b. The clutch 340 a/b can be positioned relative to the first axle 316 in either: (i) an activated configuration/position or (ii) a deactivated configuration/position, as described further below.

When the clutch 340a/b is activated, the clutch 340a/b causes the first axle 316 to be rigidly coupled to the frame 312. In such a case, a rotation of the first axle 316 results in the tilting of the frame 312 (as indicated by the arrow 141 in FIG. 9). In contrast, when the clutches 340a/b are deactivated, the first axle 316 is rotatably coupled to the frame 312. That is, the first axle 316 rotates in relation to the frame 312. In such a case, rotation of the first axle 316 results in driving rotation of the first conveyor roller 314 and, in turn, driving of the conveyor belt 311 (as indicated by the arrow 143) without effecting the angular orientation or tilt angle of the frame 312.

As stated above, the material handling system 300 includes the first motor 330. The first motor 330 can be any suitable type of electric or hydraulic motor including, but not limited to, a low KV brushless DC drive motor (e.g., 500-750 kv driven from a standard PWM based variable speed Hall sensor brushless Electronic Speed Control). While the depicted embodiment of the material handling system 300 includes just one first motor 330, in some embodiments two such motors are included.

The material handling system 300 includes a drive train via which the first motor 330 can drive rotations of the first axle 316. In the depicted non-limiting arrangement, the first motor 330 (e.g., refer to FIG. 10) drives a belt 331 that, in turn, drives a shaft 332. The shaft 332, in turn, drives a first drive belt 382a and a second drive belt 382b (collectively referred to as "drive belt 382a/b"). The drive belt 382a/b can be a timing belt or synchro belt, for example. In some embodiments, the drive belt 382a/b can be a chain. The drive belt 382a/b, in turn, drives a first axle pulley 380a and a second axle pulley 380b (collectively referred to as "axle pulley 380a/b"). The drive belt 382a/b also drives rotations of a first idler pulley 384a and a second idler pulley 384b (collectively referred to as "idler pulley 384a/b"). The axle pulley 380a/b is rigidly coupled to the first axle 316. Accordingly, the first motor 330 drives rotations of the first axle 316 via the belt 331, the shaft 332, the drive belt 382a/b, and the axle pulley 380a/b. Of course, other drive train arrangements that result in driving rotations of the first axle 316 are also envisioned and encompassed in the scope of this disclosure.

Figure 15:
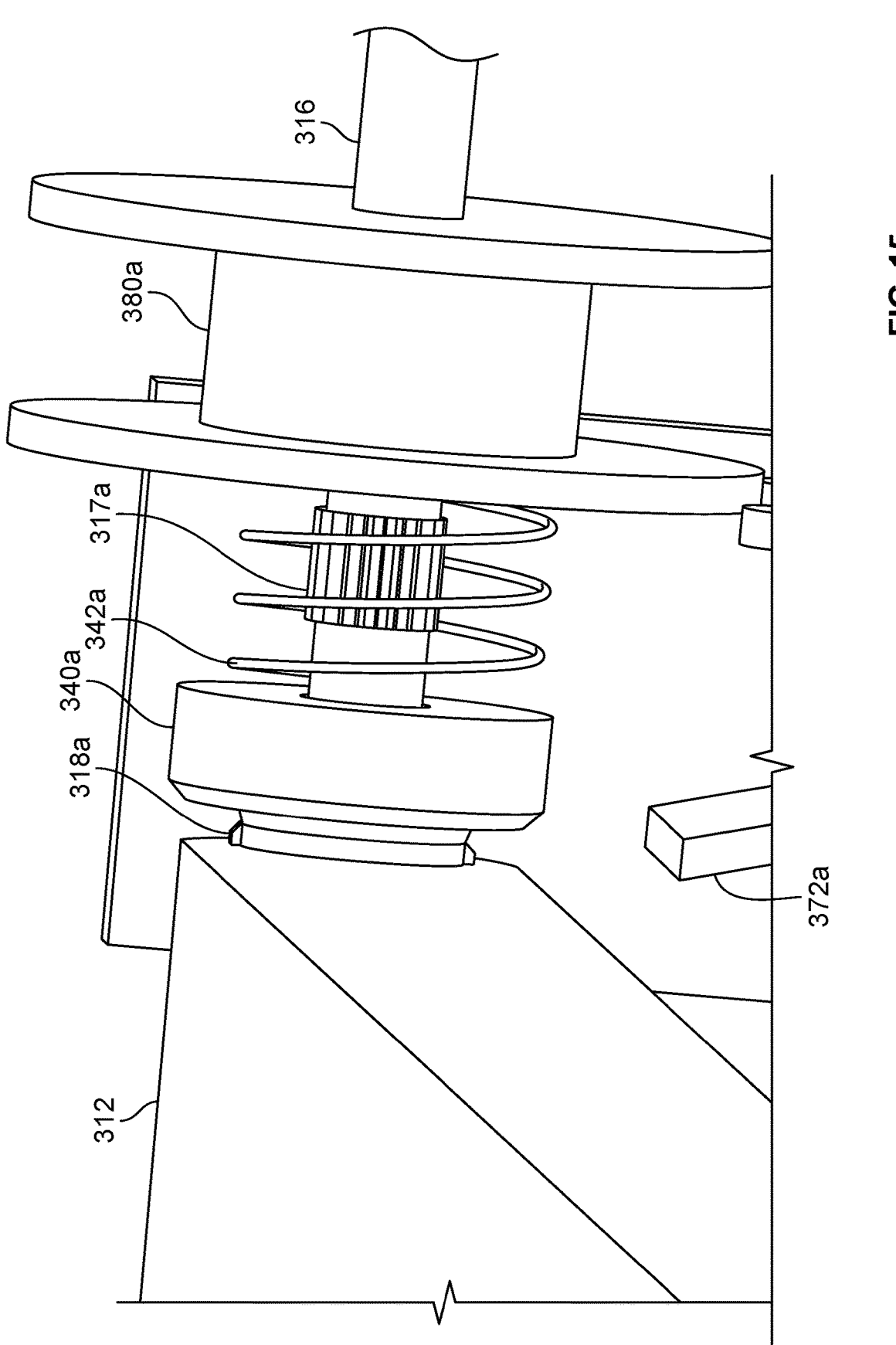
FIG. 15 is another enlarged view of an end of the portion of the material handling system of FIG. 13.
Figure 16:
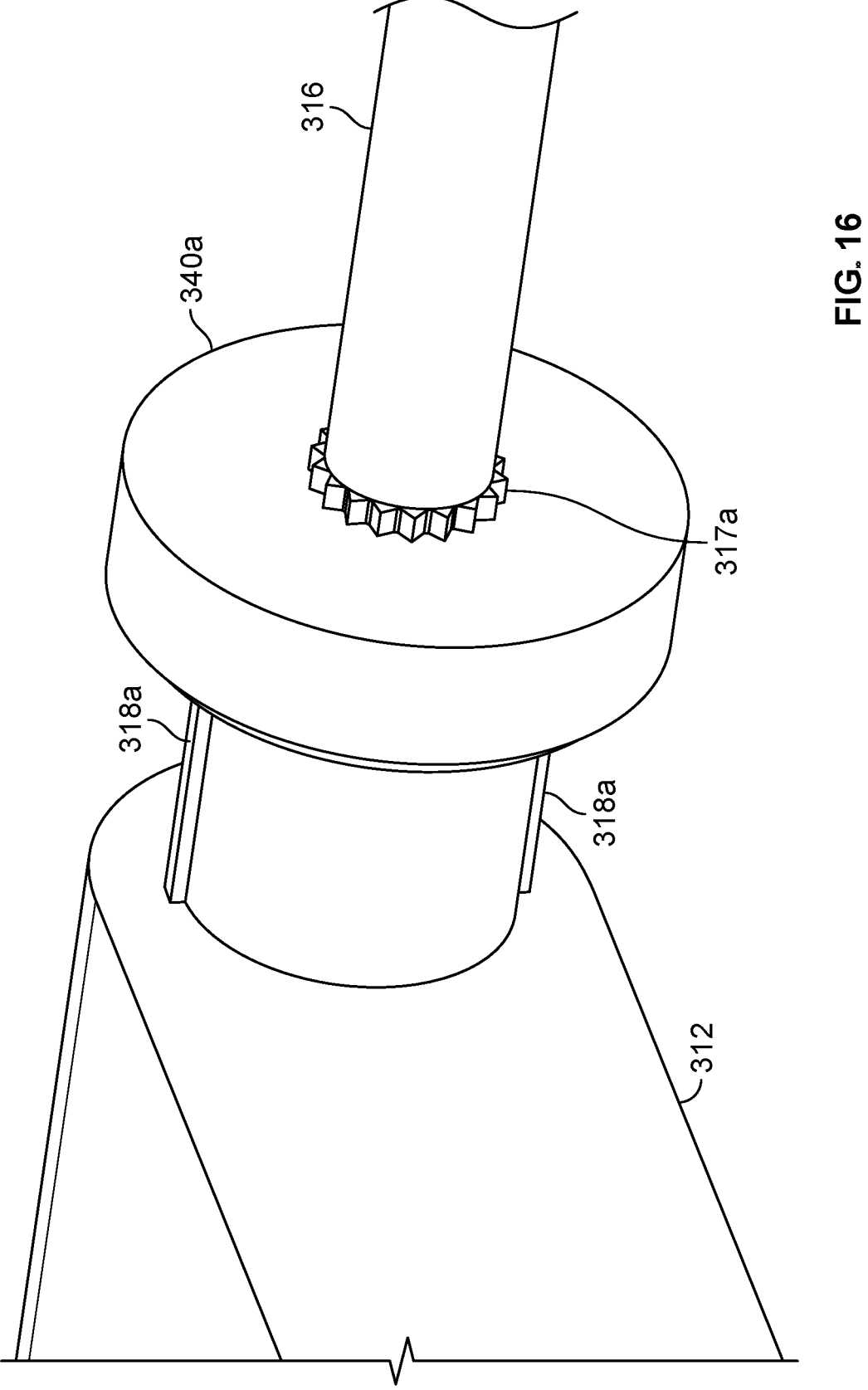
FIG. 16 is another enlarged view of an end of the portion of the material handling system of FIG. 13.

The material handling system 300 can also include a first clutch activation mechanism 370a and a second clutch activation mechanism 370b (collectively referred to as "clutch activation mechanism 370a/b"). The clutch activation mechanism 370a/b causes the clutch 340a/b to become either activated or deactivated by forcing the clutch 340a/b to slide along the first axle 316. In FIGS. 13, 14, and 16, the clutch 340a/b is shown in the activated configuration/position. In FIGS. 12 and 15, the clutch 340a/b is shown in the deactivated configuration/position.

In the depicted example, the clutch 340a/b is coupled to the frame 312 via a key 318a/b and keyway coupling arrangement (e.g., as visible in FIGS. 15 and 16). Accordingly, the clutch 340a/b can be slid along the first axle 316 by the clutch activation mechanism 370a/b while remaining rotatably coupled to the frame 312 and mechanically capable of driving tilting motions of the frame 312 (as indicated by the arrow 141 in FIG. 9).

In the depicted example, the first axle 316 includes a spline 317a/b. The bore of the clutch 340a/b is configured to slidably couple with the spline 317a/b and to decouple from the spline 317a/b as the clutch 340a/b is forced to slide along the first axle 316 by the clutch activation mechanism 370a/b between the activated and deactivated positions, respectively.

When the clutch 340a/b is in the activated configuration/position, the clutch 340a/b is coupled with the spline 317a/b (e.g., see FIGS. 13, 14, and 16). Accordingly, rotation of the first axle 316 causes tilting of the frame 312 via the spline 317a/b, the clutch 340a/b, the key 318a/b, and the keyway of the frame 312. Rotation of the first axle 316 also causes rotation of the first conveyor roller 314 (which rotates in synchronous combination with the tilting of the frame 312).

When the clutch 340a/b is in the deactivated configuration/position, the clutch 340a/b is uncoupled from the spline 317a/b (e.g., see FIGS. 12 and 15). Accordingly, rotation of the first axle 316 has no effect on the frame 312 because the first axle 316 freewheels in relation to the clutch 340a/b. However, rotation of the first axle 316 does cause rotation of the first conveyor roller 314 when the clutch 340a/b is in the deactivated configuration/position. Such rotations of the first conveyor roller 314 drive the conveyor belt 311.

The clutch 340a/b also includes a spring 342a/b (e.g., see FIG. 15). The spring 342a/b biases the clutch 340a/b to its disengaged configuration in which the clutch 340a/b is uncoupled from the spline 317a/b.

The clutch activation mechanism 370a/b causes the clutch 340a/b to become activated as the frame 312 is lowered by the linear actuator 350a/b to its home position (e.g., as shown in FIGS. 9, 10, 13, and 14). In the depicted embodiment, the home position is the lower end of travel position of the first axle 316. However, in some embodiments the home position in which the clutch 340a/b is activated is at one or more positions other than, or in addition to, the lower end of travel position.

As the linear actuator 350a/b raises the first axle 316 from the home position, the clutch activation mechanism 370a/b causes the clutch 340a/b to become deactivated. Hence, when the first axle 316 is in the home position, activation of the first motor 330 will cause the conveyor 310 to change its tilt angle. However, when the first axle 316 is not in the home position, activation of the first motor 330 will cause the conveyor belt 311 to move without causing the conveyor 310 to change its tilt angle.

In the depicted embodiment, the clutch activation mechanism 370a/b includes a clutch guide 372a/b (e.g., see FIGS. 12-15). The clutch guide 372a/b is a ramp device that engages with the clutch 340a/b and applies force to the clutch 340a/b to move the clutch 340a/b along the first axle 316. The clutch guide 372a/b moves the clutch 340a/b to its activated position as the first axle 316 is moved (lowered) into the home position by the linear actuator 350a/b.

In some embodiments, the clutch 340a/b defines an annular groove that receives and slidably engages with portions of the clutch guide 372a/b. For example, in FIG. 12, the clutch 340a/b is in its deactivated position. Then, as the first axle 316 is lowered by the linear actuator 350a/b toward its home position, the clutch guide 372a/b engages with the groove of the clutch 340a/b. As the first axle 316 is lowered still farther, the ramp nature of the clutch guide 372a/b forces the clutch 340a/b to gradually slide outward along the first axle 316 toward the axle pulley 380a/b (as shown in FIGS. 13 and 14) where the clutch 340a/b eventually becomes engaged with the spline 317a/b. The clutch 340a/b thereby becomes positioned in its activated position when the first axle 316 reaches its home position.

With the clutch 340a/b in its activated position, the first motor 330 can drive tilting movements of the frame 312. The tilting movements can be ceased at any time to position the conveyor 310 at any designed angle. In some embodiments, this tilting movement functionality is used for releasably engaging the conveyor attachment arms 313 to an adjacent structure as desired (e.g., see FIG. 11).

In some embodiments, the conveyor 310 has a storage position in which the conveyor 310 is essentially vertically oriented. That is, with the first axle 316 in its home position, the opposite end of the conveyor 310 can be tilted upward until the conveyor 310 is extending essentially vertically. In such an arrangement, the second conveyor roller 315 is vertically above the first conveyor roller 314. In some embodiments, the material handling system 300 can include a latch mechanism (e.g., solenoid or other type of automated latching device) that releasably secures the conveyor 310 in the vertically oriented storage position.

To disengage or deactivate the clutch 340a/b, the first axle 316 is raised by the linear actuator 350a/b away from its home position. The ramp nature of the clutch guide 372a/b forces the clutch 340a/b to slide inward along the first axle 316 toward the frame 312 (as shown in FIGS. 12 and 15) where the clutch 340a/b eventually becomes disengaged from the spline 317a/b. Accordingly, with the clutch 340a/b in its deactivated position, activation of the first motor 330 will cause the first axle 316 to drive the first conveyor roller 314 and the conveyor belt 311 (without causing any tilting movements of the frame 312).

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

What is claimed is:

1. (Previously PresenteA material handling system comprising:
   a conveyor including: (i) a frame and (ii) a first conveyor roller having a first axle;
   a first motor arranged to drive rotations of the first axle;
   a clutch arranged to releasably couple the first axle to the frame;
   a linear actuator coupled to the first axle and configured to move the first axle from a home position to a plurality of other positions; and
   a clutch activation mechanism that causes the clutch to couple the first axle to the frame in response to the first axle being in the home position.

2. The system of claim 1, wherein the clutch activation mechanism comprises a clutch guide that applies force to move the clutch into an activated position as the first axle moves into the home position.

3. The system of claim 2, wherein the force from the clutch activation mechanism slides the clutch along the first axle and into engagement with a spline on the first axle.

4. The system of claim 2, further comprising a spring that biases the clutch away from the activated position.

5. The system of claim 1, further comprising:
   an axle pulley attached to the first axle; and
   a drive belt arranged to apply torque from the first motor to the pulley.

6. The system of claim 5, further comprising an idler pulley, wherein the drive belt extends between the axle pulley and the idler pulley.

7. The system of claim 1, wherein the linear actuator comprises:
   a leadscrew;
   a nut engaged with threads of the leadscrew and rotatably coupled to the first axle; and
   a second motor arranged to drive rotations of the leadscrew.

8. The system of claim 1, wherein the home position is an end of travel position of the linear actuator.

9. The system of claim 1, wherein the first conveyor roller is positioned at a first end of the frame, and wherein the system further comprises a second conveyor roller attached at a second end of the frame that is opposite of the first end of the frame.

10. The system of claim 9, wherein the second conveyor roller is an idler roller, and wherein the conveyor further comprises a belt that extends between the first and second conveyor rollers.

* * * * *